United States Patent
Lee et al.

(10) Patent No.: US 9,507,465 B2
(45) Date of Patent: Nov. 29, 2016

(54) TECHNIQUE FOR INCREASING THE SENSITIVITY OF CAPACITIVE SENSOR ARRAYS

(75) Inventors: Mark R. Lee, Edmonds, WA (US);
Ryan D. Seguine, Seattle, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 2533 days.

(21) Appl. No.: 11/493,350

(22) Filed: Jul. 25, 2006

(65) Prior Publication Data
US 2008/0024455 A1 Jan. 31, 2008

(51) Int. Cl.
*G09G 5/08* (2006.01)
*G06F 3/044* (2006.01)

(52) U.S. Cl.
CPC ..................................... *G06F 3/044* (2013.01)

(58) Field of Classification Search
CPC ... G06F 3/04; G06F 3/0488; G06F 2203/041
USPC .......................................... 345/161, 173, 156
See application file for complete search history.

(56) References Cited

U.S. PATENT DOCUMENTS

| | | | |
|---|---|---|---|
| 4,266,144 A * | 5/1981 | Bristol | ......................... 307/116 |
| 4,283,713 A | 8/1981 | Philipp | |
| 4,438,404 A | 3/1984 | Philipp | |
| 4,475,151 A | 10/1984 | Philipp | |
| 4,497,575 A | 2/1985 | Philipp | |
| 4,736,097 A | 4/1988 | Philipp | |
| 4,773,024 A | 9/1988 | Faggin et al. | |
| 4,802,103 A | 1/1989 | Faggin et al. | |
| 4,876,534 A | 10/1989 | Mead et al. | |
| 4,879,461 A | 11/1989 | Philipp | |
| 4,935,702 A | 6/1990 | Mead et al. | |
| 4,953,928 A | 9/1990 | Anderson et al. | |
| 4,962,342 A | 10/1990 | Mead et al. | |
| 5,049,758 A | 9/1991 | Mead et al. | |
| 5,055,827 A | 10/1991 | Philipp | |
| 5,059,920 A | 10/1991 | Anderson et al. | |
| 5,068,622 A | 11/1991 | Mead et al. | |
| 5,073,759 A | 12/1991 | Mead et al. | |
| 5,083,044 A | 1/1992 | Mead et al. | |
| 5,095,284 A | 3/1992 | Mead | |
| 5,097,305 A | 3/1992 | Mead et al. | |
| 5,107,149 A | 4/1992 | Platt et al. | |
| 5,109,261 A | 4/1992 | Mead et al. | |
| 5,119,038 A | 6/1992 | Anderson et al. | |
| 5,120,996 A | 6/1992 | Mead et al. | |

(Continued)

OTHER PUBLICATIONS

Cypress Semiconductor Corporation, "Cypress Introduces PSoC(TM)-Based Capacitive Touch Sensor Solution", Cypress Press Release, May 31, 2005, http://www.cypress.com/portal/server.pt?space=CommunityPage&control=SetCommunity&CommunityID=208&PageID=218&DirectoryID=661552 (Retrieved on Feb. 5, 2007).

(Continued)

*Primary Examiner* — William Boddie
*Assistant Examiner* — Leonid Shapiro

(57) ABSTRACT

A technique for operating a capacitive sensor array. The technique includes logically grouping capacitance sensors of an array of capacitance sensors into sensor groups. The sensor groups each include at least two capacitance sensors of the array of capacitance sensors. Values indicative of a capacitance for each of the sensor groups are measured. The measured values are then analyzed to determine a location of a user interaction with the array of capacitance sensors.

18 Claims, 10 Drawing Sheets

(56) References Cited

U.S. PATENT DOCUMENTS

| | | | |
|---|---|---|---|
| 5,122,800 A | 6/1992 | Philipp | |
| 5,126,685 A | 6/1992 | Platt et al. | |
| 5,146,106 A | 9/1992 | Anderson et al. | |
| 5,160,899 A | 11/1992 | Anderson et al. | |
| 5,165,054 A | 11/1992 | Platt et al. | |
| 5,166,562 A | 11/1992 | Allen et al. | |
| 5,204,549 A | 4/1993 | Platt et al. | |
| 5,237,879 A * | 8/1993 | Speeter | 73/862.041 |
| 5,243,554 A | 9/1993 | Allen et al. | |
| 5,248,873 A | 9/1993 | Allen et al. | |
| 5,260,592 A | 11/1993 | Mead et al. | |
| 5,270,963 A | 12/1993 | Allen et al. | |
| 5,276,407 A | 1/1994 | Mead et al. | |
| 5,289,023 A | 2/1994 | Mead | |
| 5,303,329 A | 4/1994 | Mead et al. | |
| 5,305,017 A | 4/1994 | Gerphide | |
| 5,324,958 A | 6/1994 | Mead et al. | |
| 5,331,215 A | 7/1994 | Allen et al. | |
| 5,336,936 A | 8/1994 | Allen et al. | |
| 5,339,213 A | 8/1994 | O'Callaghan | |
| 5,349,303 A | 9/1994 | Gerpheide | |
| 5,374,787 A | 12/1994 | Miller et al. | |
| 5,381,515 A | 1/1995 | Platt et al. | |
| 5,384,467 A | 1/1995 | Plimon et al. | |
| 5,408,194 A | 4/1995 | Steinbach et al. | |
| 5,488,204 A | 1/1996 | Mead et al. | |
| 5,495,077 A | 2/1996 | Miller et al. | |
| 5,541,878 A | 7/1996 | LeMoncheck et al. | |
| 5,543,588 A | 8/1996 | Bisset et al. | |
| 5,543,590 A | 8/1996 | Gillespie et al. | |
| 5,543,591 A | 8/1996 | Gillespie et al. | |
| 5,555,907 A | 9/1996 | Philipp | |
| 5,565,658 A | 10/1996 | Gerpheide et al. | |
| 5,566,702 A | 10/1996 | Philipp | |
| 5,629,891 A | 5/1997 | LeMoncheck et al. | |
| 5,648,642 A | 7/1997 | Miller et al. | |
| 5,682,032 A | 10/1997 | Philipp | |
| 5,730,165 A | 3/1998 | Philipp | |
| 5,757,368 A | 5/1998 | Gerpheide et al. | |
| 5,763,909 A | 6/1998 | Mead et al. | |
| 5,767,457 A | 6/1998 | Gerpheide et al. | |
| 5,796,183 A | 8/1998 | Hourmand | |
| 5,812,698 A | 9/1998 | Platt et al. | |
| 5,841,078 A | 11/1998 | Miller et al. | |
| 5,844,265 A | 12/1998 | Mead et al. | |
| 5,854,625 A | 12/1998 | Frisch et al. | |
| 5,861,583 A | 1/1999 | Schediwy et al. | |
| 5,861,875 A | 1/1999 | Gerpheide | |
| 5,864,242 A | 1/1999 | Allen et al. | |
| 5,864,392 A | 1/1999 | Winklhofer et al. | |
| 5,880,411 A | 3/1999 | Gillespie et al. | |
| 5,889,236 A | 3/1999 | Gillespie et al. | |
| 5,914,465 A | 6/1999 | Allen et al. | |
| 5,914,708 A | 6/1999 | LaGrange et al. | |
| 5,920,310 A | 7/1999 | Faggin et al. | |
| 5,926,566 A | 7/1999 | Wang et al. | |
| 5,942,733 A | 8/1999 | Allen et al. | |
| 5,943,052 A | 8/1999 | Allen et al. | |
| 5,969,513 A | 10/1999 | Clark | |
| 6,023,422 A | 2/2000 | Allen et al. | |
| 6,028,271 A | 2/2000 | Gillespie et al. | |
| 6,028,959 A | 2/2000 | Wang et al. | |
| 6,097,432 A | 8/2000 | Mead et al. | |
| 6,148,104 A | 11/2000 | Wang et al. | |
| 6,185,450 B1 | 2/2001 | Seguine et al. | |
| 6,188,228 B1 | 2/2001 | Philipp | |
| 6,188,391 B1 | 2/2001 | Seely et al. | |
| 6,222,528 B1 | 4/2001 | Gerpheide et al. | |
| 6,239,389 B1 | 5/2001 | Allen et al. | |
| 6,249,447 B1 | 6/2001 | Boylan et al. | |
| 6,262,717 B1 | 7/2001 | Donohue et al. | |
| 6,280,391 B1 | 8/2001 | Olson et al. | |
| 6,288,707 B1 | 9/2001 | Philipp | |
| 6,304,014 B1 | 10/2001 | England et al. | |
| 6,320,184 B1 | 11/2001 | Winklhofer et al. | |
| 6,323,846 B1 | 11/2001 | Westerman et al. | |
| 6,326,859 B1 | 12/2001 | Goldman et al. | |
| 6,377,009 B1 | 4/2002 | Philipp | |
| 6,380,929 B1 | 4/2002 | Platt | |
| 6,380,931 B1 | 4/2002 | Gillespie et al. | |
| 6,414,671 B1 | 7/2002 | Gillespie et al. | |
| 6,430,305 B1 | 8/2002 | Decker | |
| 6,441,073 B1 | 8/2002 | Tanaka et al. | |
| 6,452,514 B1 | 9/2002 | Philipp | |
| 6,457,355 B1 | 10/2002 | Philipp | |
| 6,466,036 B1 | 10/2002 | Philipp | |
| 6,473,069 B1 | 10/2002 | Gerpheide | |
| 6,489,899 B1 | 12/2002 | Ely et al. | |
| 6,498,720 B2 | 12/2002 | Glad | |
| 6,499,359 B1 | 12/2002 | Washeleski et al. | |
| 6,522,128 B1 | 2/2003 | Ely et al. | |
| 6,523,416 B2 | 2/2003 | Takagi et al. | |
| 6,534,970 B1 | 3/2003 | Ely et al. | |
| 6,535,200 B2 | 3/2003 | Philipp | |
| 6,570,557 B1 | 5/2003 | Westerman et al. | |
| 6,587,093 B1 | 7/2003 | Shaw et al. | |
| 6,610,936 B2 | 8/2003 | Gillespie et al. | |
| 6,624,640 B2 | 9/2003 | Lund et al. | |
| 6,639,586 B2 | 10/2003 | Gerpheide | |
| 6,642,857 B1 | 11/2003 | Schediwy et al. | |
| 6,649,924 B1 | 11/2003 | Philipp et al. | |
| 6,667,740 B2 | 12/2003 | Ely et al. | |
| 6,673,308 B2 | 1/2004 | Hino et al. | |
| 6,677,932 B1 | 1/2004 | Westerman | |
| 6,680,731 B2 | 1/2004 | Gerpheide et al. | |
| 6,683,462 B2 | 1/2004 | Shimizu | |
| 6,705,511 B1 | 3/2004 | Dames et al. | |
| 6,714,817 B2 | 3/2004 | Daynes et al. | |
| 6,730,863 B1 | 5/2004 | Gerpheide et al. | |
| 6,750,852 B2 | 6/2004 | Gillespie et al. | |
| 6,788,221 B1 | 9/2004 | Ely et al. | |
| 6,798,218 B2 | 9/2004 | Kasperkovitz | |
| 6,809,275 B1 | 10/2004 | Cheng et al. | |
| 6,856,433 B2 | 2/2005 | Hatano et al. | |
| 6,873,203 B1 | 3/2005 | Latham, II et al. | |
| 6,888,538 B2 | 5/2005 | Ely et al. | |
| 6,893,724 B2 | 5/2005 | Lin et al. | |
| 6,969,978 B2 | 11/2005 | Dening | |
| 6,975,123 B1 | 12/2005 | Malang et al. | |
| 7,119,550 B2 | 10/2006 | Kitano et al. | |
| 7,932,897 B2 * | 4/2011 | Elias et al. | 345/174 |
| 2002/0063688 A1 | 5/2002 | Shaw et al. | |
| 2002/0191029 A1 | 12/2002 | Gillespie et al. | |
| 2003/0025679 A1 | 2/2003 | Taylor et al. | |
| 2003/0062889 A1 | 4/2003 | Ely et al. | |
| 2003/0063428 A1 | 4/2003 | Nishi | |
| 2003/0080755 A1 | 5/2003 | Kobayashi | |
| 2003/0156098 A1 | 8/2003 | Shaw et al. | |
| 2003/0160808 A1 | 8/2003 | Foote et al. | |
| 2003/0183864 A1 | 10/2003 | Miyazawa | |
| 2003/0183884 A1 | 10/2003 | Miyazawa | |
| 2004/0169594 A1 | 9/2004 | Ely et al. | |
| 2004/0178997 A1* | 9/2004 | Gillespie et al. | 345/173 |
| 2004/0252109 A1* | 12/2004 | Trent, Jr. | G06F 3/03547 345/174 |
| 2004/0263864 A1 | 12/2004 | Lukacs et al. | |
| 2005/0021269 A1 | 1/2005 | Ely et al. | |
| 2005/0024341 A1 | 2/2005 | Gillespie et al. | |
| 2005/0052429 A1* | 3/2005 | Philipp | 345/173 |
| 2005/0073302 A1 | 4/2005 | Hibbs et al. | |
| 2005/0073322 A1 | 4/2005 | Hibbs et al. | |
| 2005/0083110 A1 | 4/2005 | Latham, II et al. | |
| 2006/0032680 A1 | 2/2006 | Elias et al. | |
| 2006/0097991 A1 | 5/2006 | Hotelling et al. | |
| 2006/0113974 A1 | 6/2006 | Kan et al. | |
| 2006/0139340 A1* | 6/2006 | Geaghan | 345/177 |
| 2006/0164142 A1 | 7/2006 | Stanley | |
| 2006/0273804 A1 | 12/2006 | Delorme et al. | |

(56) References Cited

U.S. PATENT DOCUMENTS

2007/0247446 A1* 10/2007 Orsley et al. ............... 345/184
2008/0007434 A1* 1/2008 Hristov ...................... 341/22

OTHER PUBLICATIONS

Seguine, Ryan, "Layout Guidelines for PSoC™ CapSense™," Cypress Semiconductor Corporation, Application Note AN2292, pp. 1-10, Jul. 22, 2005.

Lee, Mark, "EMC Design considerations for PsoC™ CapSense™ Applications," Cypress Semiconductor Corporation, Application Note AN2318, pp. 1-6, Sep. 16, 2005.

Cypress Semiconductor Corporation, "Release Notes srn017," pp. 1-3, Jan. 24, 2007.

Cypress Semiconductor Corporation, "PSoC® CY8C20x34 Technical Reference Manual (TRM)," PSoC CY8C20x34 TRM, Version 1.0, pp. 1-218, 2006.

Sedra, Adel S. et al., "Microelectronic Circuits," $3^{rd}$ Edition, Oxford University Press, pp. xiii-xx and 861-883, 1991.

Van Ess, David, "Simulating a 555 Timer with PSoC™," Cypress Semiconductor Corporation, Application Note AN2286, pp. 1-10, May 19, 2005.

Cypress Semiconductor Corporation, "FAN Controller CG6457AM and CG6462AM," PSoC™ Mixed-Signal Array Preliminary Data Sheet, pp. 1-25, May 24, 2005.

Cypress Semiconductor Corporation, "PsoC Mixed-Signal Controllers," Product Description, pp. 1-2, http://www.cypress.com/portal/server.pt?space=CommunityPage&control=SetCommunity&CommunityID=209&PageID=215&gid=13&fid=24&category=false. (Sep. 27, 2005).

Cypress Semiconductor Corporation, "CY8C21x34 Data Sheet," CSR User Module, CSR V.1.0, Oct. 6, 2005, pp. 1-36.

Chapweske, Adam, "The PS/2 Mouse Interface," PS/2 Mouse Interfacing, 2001.

USPTO Non-Final Rejection for U.S. Appl. No. 11/442,212 dated Feb. 25, 2011; 13 pages.

* cited by examiner

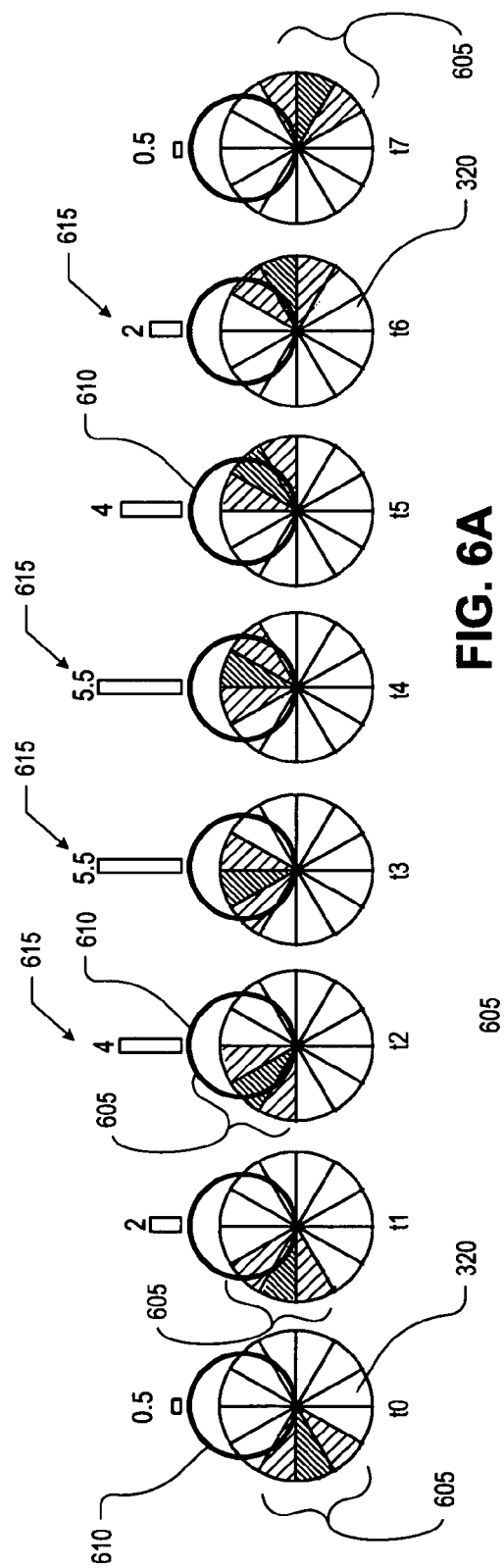
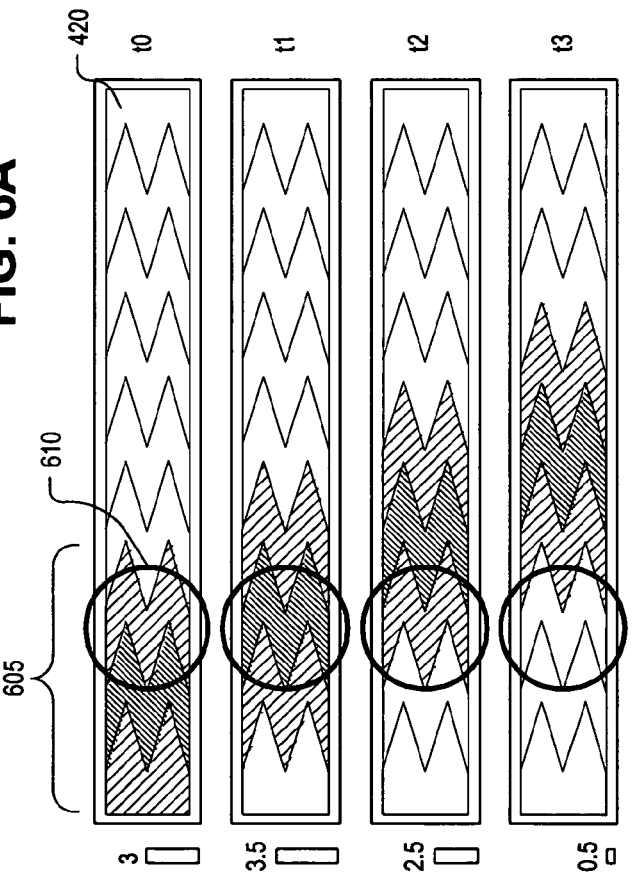
FIG. 6A
FIG. 6B

TECHNIQUE FOR INCREASING THE SENSITIVITY OF CAPACITIVE SENSOR ARRAYS

TECHNICAL FIELD

This disclosure relates generally to user interface devices, and in particular but not exclusively, relates to capacitive sense user interface devices.

BACKGROUND INFORMATION

Computing devices, such as notebook computers, personal data assistants (PDAs), and mobile handsets, have user interface devices, which are also known as human interface devices ("HID"). One type of user interface device that has become more common is a capacitive sense interface. This technology is often referred to as capacitive touch-sense technology; however, this term is a misguided term since the user need not actually physically touch the interface to operate the technology. Rather, the user need only bring a conductive object (e.g., a finger) in close proximity to the capacitive sense interface.

Capacitive sense interfaces may assume a variety of shapes and sizes. FIG. 1A illustrates a conventional circular slider interface 105 having a center mechanical button 110. The illustrated circular slider interface 105 includes eight radial capacitive sensors 115 encircling mechanical button 110 and a processing device 120. Processing device 120 monitors capacitive changes in each of capacitive sensors 115 to register user interactions with circular slider interface 105. Circular sliders may be used to convey absolute positional information of a conductive object, such as to emulate a mouse in controlling cursor positioning on a display, or to emulate a scrolling function of the mouse, but may also be used to actuate one or more functions associated with the sensing elements of the sensing device.

FIG. 1B illustrates a conventional linear slider interface 130. Linear slider interface 130 includes a surface area on which a conductive object may be used to position a cursor in the x-axis (or alternatively in the y-axis). Linear slider interface 130 may include a one-dimensional array of capacitance sensors 135. When making contact or coming in proximity with a particular portion of linear slider interface 100, the individual capacitive sensors 135 will sense capacitive variations that are translated into absolute or relative user interaction position. The capacitance variation may be sent as a signal to a coupled processing device (not illustrated) for analysis. For example, by detecting the capacitance variation of each sensor element, the position of the changing capacitance can be pinpointed. In other words, it can be determined which sensor element has detected the presence of the conductive object, and it can also be determined the motion and/or the position of the conductive object over multiple sensor elements.

FIG. 1C illustrates a conventional touch pad interface 140. Touchpad interface 140 is often used in notebooks to emulate the function of a personal computer ("PC") mouse. A touch-sensor pad is typically embedded into a PC notebook for built-in portability. Touch pad interface 140 can replicate mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on touch pad interface 140 itself. Touch pad interface 140 provides a user interface device for performing such functions as positioning a cursor, or selecting an item on a display. Touch pad interface 140 may include multi-dimensional sensor arrays for detecting movement in multiple axes. For example, touch pad interface 140 may be implemented as a two-dimensional array of linear sliders.

As consumer electronic devices continue to shrink so to do their user interfaces. A smaller capacitive sense user interface typically means smaller individual capacitive sensors within the user interface. Shrinking the size of a capacitive sensor adversely affects its sensitivity, resulting in a detrimental effect on the user experience. Decreased sensitivity due to shrinking sensor size can be partially compensated by increasing the sampling time of a particular capacitive sensor. However, increasing the sampling time for each capacitive sensor within an array of capacitive sensors reduces the response time of the user interface—once again with detrimental effects on the user experience.

As capacitive sense technology is introduced into other more durable consumer products, such as white goods (e.g., kitchen appliances), the overlay material that protects the capacitive sensors must typically be thicker and more durable to protect the underlying electronics from harsher environments. The thicker dielectric materials also adversely impact the sensitivity of capacitive sense user interfaces.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 6A is a diagram illustrating a group scan of a circular slider array, in accordance with an embodiment of the invention.

FIG. 6B is a diagram illustrating a group scan of a linear slider array, in accordance with an embodiment of the invention.

DETAILED DESCRIPTION

Embodiments of a method, apparatus, and system for implementing a capacitive sense user interface are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
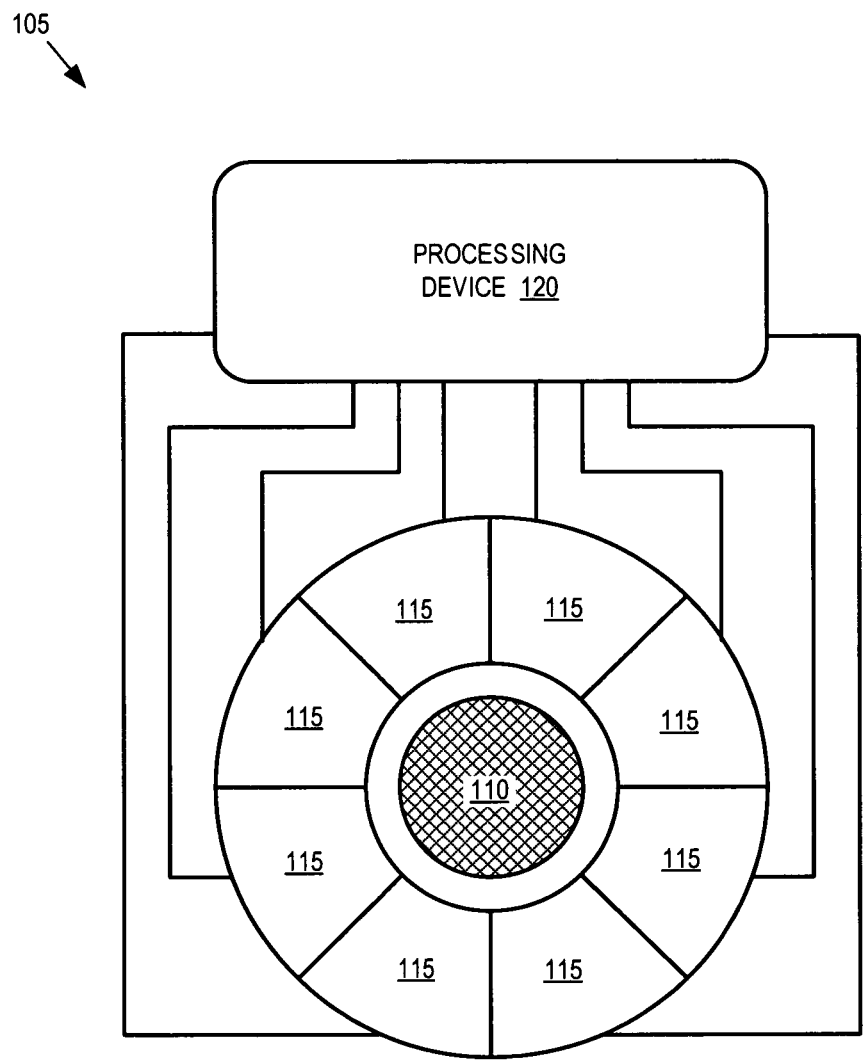
FIG. 1A illustrates a conventional circular slider interface having a center mechanical button.
Figure 1B:
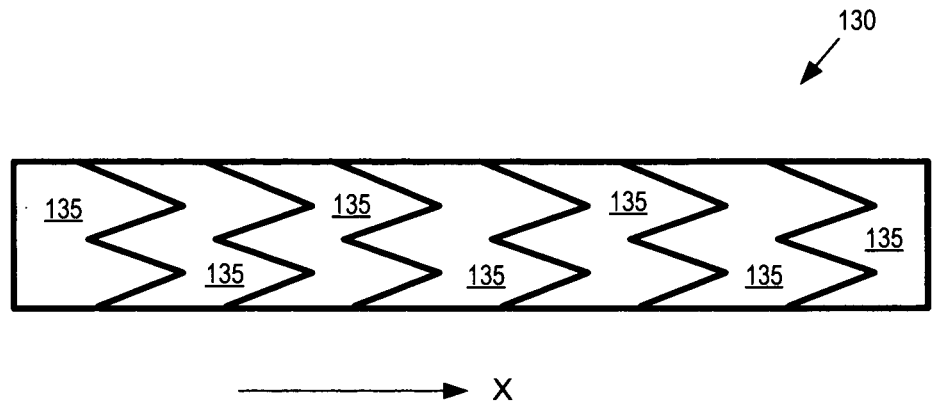
FIG. 1B illustrates a conventional linear slider interface.
Figure 1C:
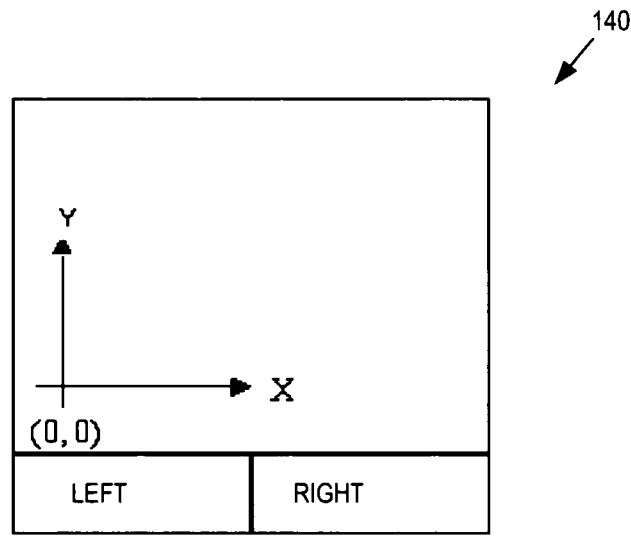
FIG. 1C illustrates a conventional touch pad interface.
Figure 2:
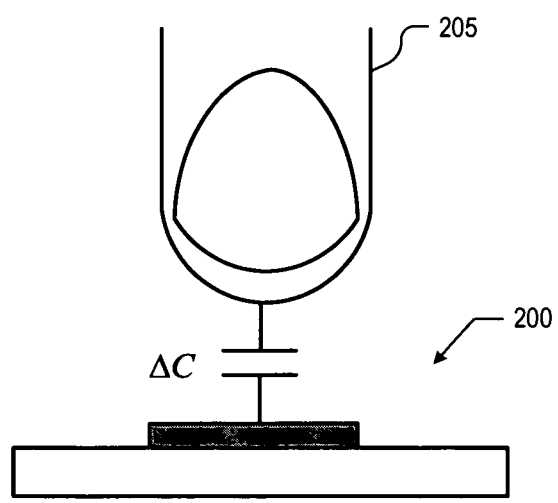
FIG. 2 illustrates a user finger interacting with a capacitance sensor, in accordance with an embodiment of the invention.

FIG. 2 illustrates a user finger 205 interacting with a capacitance sensor 200, in accordance with an embodiment of the invention. In short, when a conductive object, such as user finger 205, is moved into proximity with capacitance sensor 200, its baseline capacitance is increased, resulting in a measurable capacitance change. By monitoring capacitance sensor 200 for a baseline capacitance deviation ΔC, capacitive sensor activations can be determined and registered within software. Of course, a user interaction with capacitance sensor 200 is not limited to a finger. Other conductive objects may be used to interact with capacitive sensor 200 including, a stylus, a pen, or any other conductive object.

By grouping a plurality of capacitance sensors 200 into an array of capacitive sensors, such as a circular slider array, a linear slider array, a touch pad array, or the like, a variety of user interfaces may be implemented. For example, capacitive sensor arrays may be used to implement user interfaces of a variety of products including: door switches, white goods (e.g., kitchen appliances), laptop computers, desktop computers, personal digital assistants ("PDAs"), portable music players (e.g., MP3 players), wireless telephones, cellular telephones, radios, or the like. Capacitive sensor arrays may also be used to implement position sensors.

Figure 3:
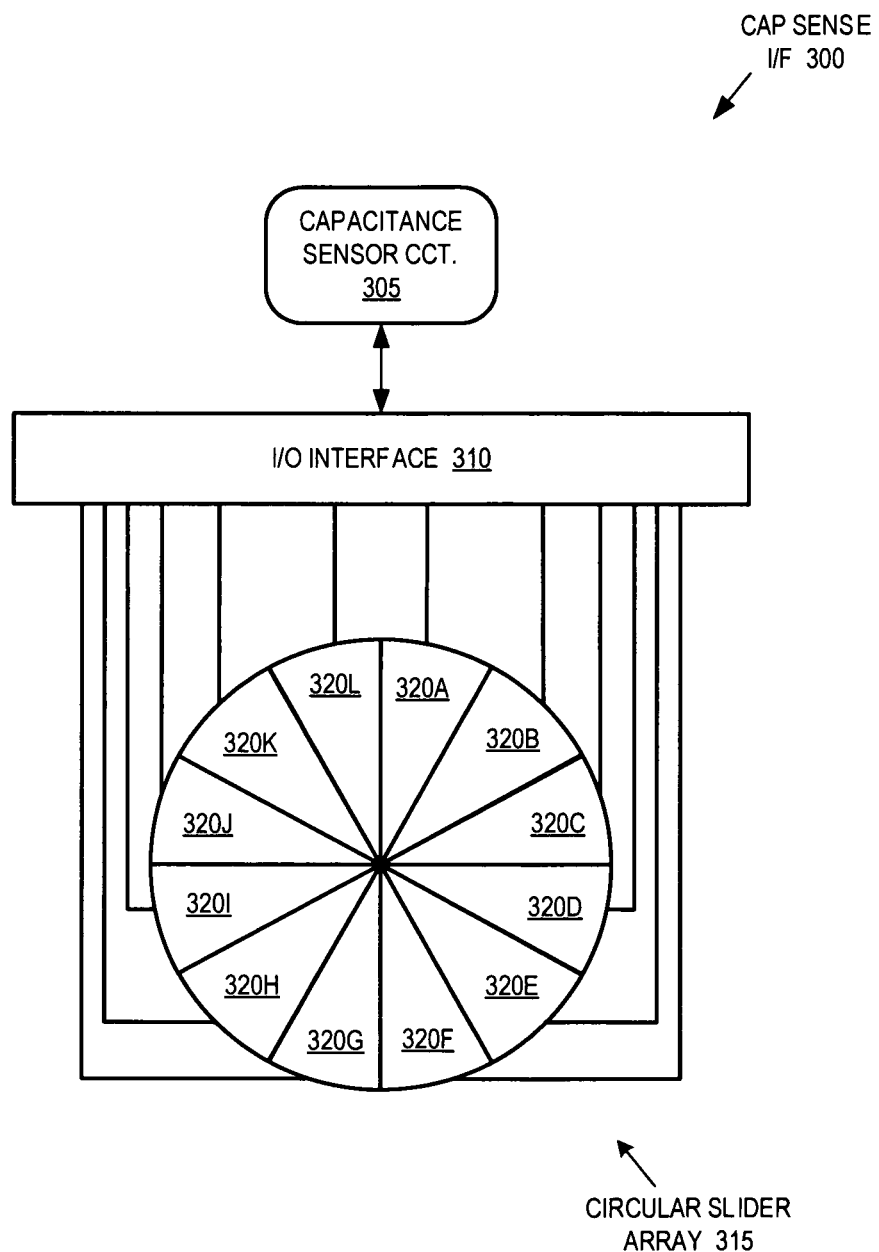
FIG. 3 is a diagram illustrating a capacitive sense interface including a circular slider array, in accordance with an embodiment of the invention.

FIG. 3 is a diagram illustrating a capacitive (CAP) sense interface 300 including a circular slider, in accordance with an embodiment of the invention. The illustrated embodiment of CAP sense interface 300 includes a capacitance sensor circuit 305, an input/output ("I/O") interface 310, and a circular slider array 315. The illustrated embodiment of circular slider array 315 includes an array of pie-slice-shaped CAP sensors 320A-320L (collectively 320). Although FIG. 3 illustrates twelve CAP sensors 320, it should be appreciated that other embodiments may include more or less CAP sensors 320 having regular or irregular sizes and shapes. Furthermore, some embodiments may include a mechanical/CAP sense button positioned in the center of circular slider array 315.

I/O interface 310 links each CAP sensor 320 to capacitance sensor circuit 305. In one embodiment, I/O interface 310 is a configurable analog interconnect between capacitance sensor circuit 305 and circular slider array 315. I/O interface 310 can be configured on the fly during regular operation to couple capacitance sensor circuit 305 to any one individual CAP sensor 320 at a time or to groups of CAP sensors 320 at a time. Once connected, to an individual CAP sensor 320 or to a group of CAP sensors 320, capacitive sensor circuit 305 can measure the capacitance of the individual or group of CAP sensors 320 to determine whether its/their capacitance has deviated by a threshold amount for a threshold period of time, thus indicating that a user activation should be registered in software (i.e., acknowledged in software such that an appropriate action or function is executed).

As mentioned, I/O interface 310 can be configured to sequentially couple capacitance sensor circuit 305 to discrete or individual CAP sensor 320 to perform a "discrete scan" of circular slider array 315. Alternatively, I/O interface 310 can be configured to sequentially couple capacitance sensor circuit 305 to groups of CAP sensors 320 at a time (referred to as sensor groups) to perform a "group scan" of circular slider array 315. Discrete scans can be performed quicker than group scans since the capacitive load of a single CAP sensor 320 is inherently smaller than a group of CAP sensors 320. Accordingly, discrete scans may be performed to quickly approximate the location on circular slider array 315 of a user interaction (e.g., finger touch), while group scans may be performed to more precisely determine the location of the user interaction. Of course, the speed of a group scan can be increased by increasing the drive current used to measure capacitance changes on the groups of CAP sensors 320. In environments where the signal to noise ratio ("SNR") of the discrete scan is not sufficient, then the group scans may be performed exclusively. Use of the group scan technique may or may not increase the SNR; however, the absolute value of the signals measured from circular slider array 315 will increase thereby increasing the sensitivity of CAP sense interface 300.

In one embodiment, CAP sensor circuit 305 includes driver circuitry of a relaxation oscillator. In this embodiment, the driver circuitry within CAP sensor circuit 305 continually charges and discharges each CAP sensor 320 by reciprocally driving and discharging a current onto CAP sensors 320. When I/O interface 310 connects the driver circuitry to a particular discrete CAP sensor 320 or a sensor group, the relaxation oscillator circuit is formed. The particular discrete CAP sensor 320 or sensor group determines the frequency at which the relaxation oscillator circuit will oscillate. To measure a capacitive change ΔC of a discrete CAP sensor 320 or a sensor group, capacitance sensor circuit 305 measures either a frequency change or period change of the oscillation associated with a particular discrete CAP sensor 320 or a particular sensor group. Accordingly, CAP sensor circuit 305 need not actually measure the absolute capacitance of a discrete CAP sensor 320 or sensor group to register an actuation, but rather can measure a value indicative of this capacitance. This value may be a simple count deviation from a baseline unactuated count value related to the period or frequency of oscillation. It should be appreciated that CAP sensor circuit 305 may be implemented with a variety of other capacitive sense technologies including a current versus voltage phase shift measurement technique, a resistor-capacitor charge timing technique, a capacitive bridge divider technique, a charge transfer technique, or the like, described in greater detail below.

Once CAP sensor circuit 305 senses that one or more CAP sensors 320 are being actuated (e.g., threshold change in a baseline capacitance for a threshold duration), then the physical location of the user interaction on circular slider array 315 may be determined by analyzing the values measured by CAP sensor circuit 305 to determine which CAP sensors 320 are being actuated. In an embodiment where analog values are being sequentially sensed for sensor groups, a more precise location may be interpolated from the values.

Figure 4:
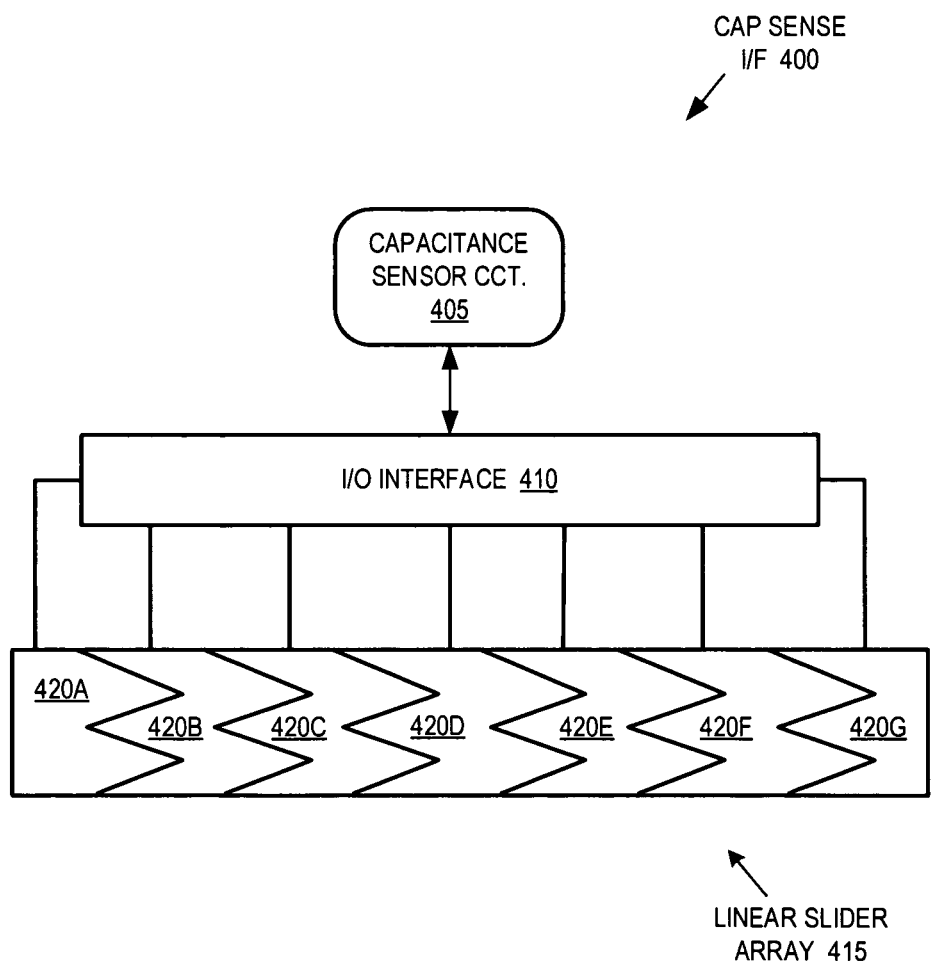
FIG. 4 is a diagram illustrating a capacitive sense interface including a linear slider array, in accordance with an embodiment of the invention.

FIG. 4 is a diagram illustrating a CAP sense interface 400 including a linear slider, in accordance with an embodiment of the invention. The illustrated embodiment of CAP sense interface 400 includes a CAP sensor circuit 405, an I/O interface 410, and a linear slider array 415. The illustrated embodiment of linear slider array 415 includes an array of CAP sensors 420A-320G (collectively 420). Although FIG. 4 illustrates seven CAP sensors 420, it should be appreciated that other embodiments may include more or less CAP sensors 420 having regular or irregular sizes and shapes.

CAP sense interface 400 operates in a similar manner as discussed above in connection with CAP sense interface 300, except that it is implemented with a linear slider array as opposed to a circular slider array. As in the case of CAP sensor 305, CAP sensor 405 can perform quick discrete scans of linear slider array 415 or more sensitive group scans of linear slider array 415. Furthermore, it should be appreciated that a two dimensional array of linear slider array 415 may be used to implement a CAP sense touch pad.

Figure 5:
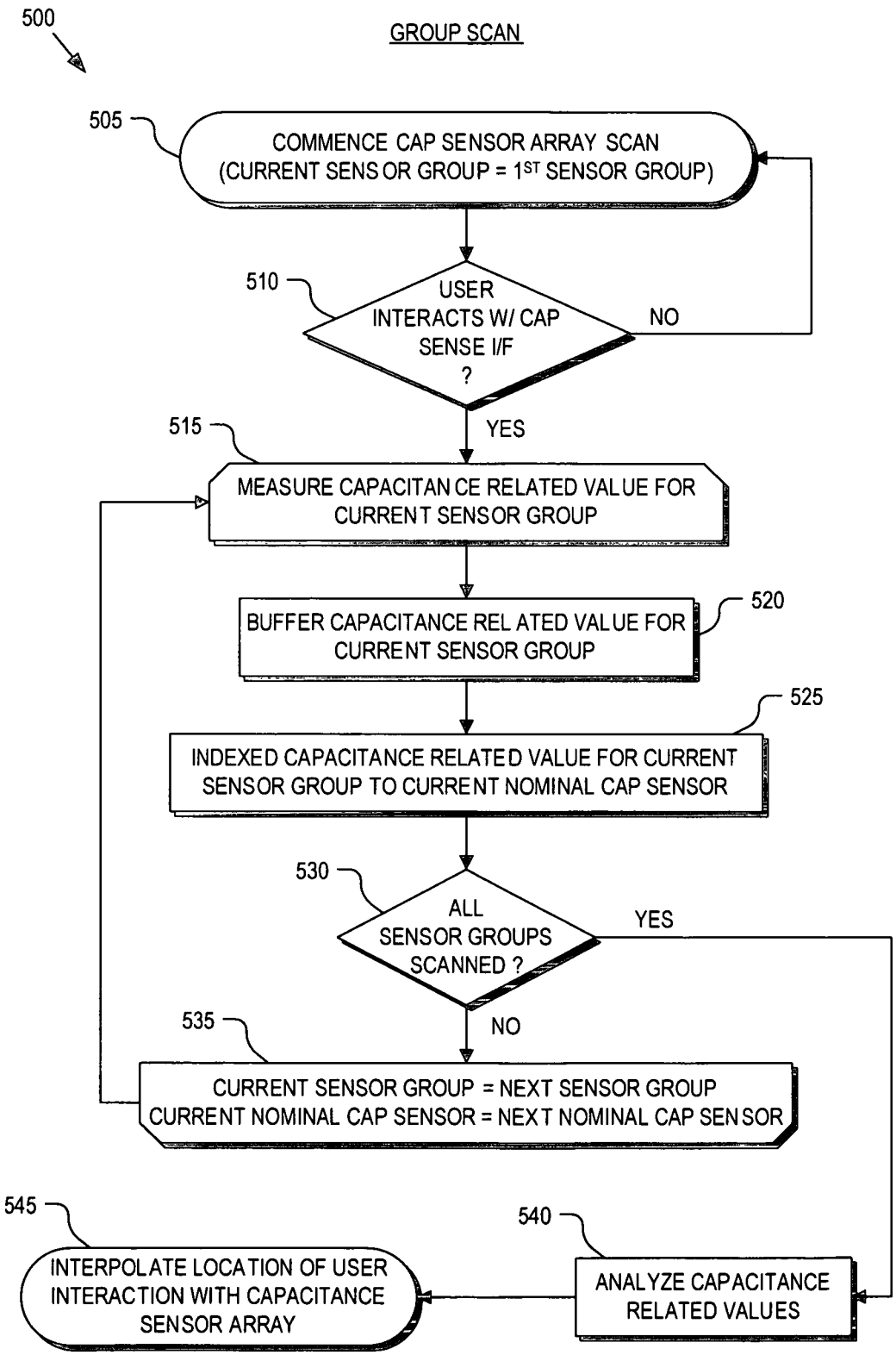
FIG. 5 is a flow chart illustrating a process to group scan a capacitive sense interface, in accordance with an embodiment of the invention.

FIG. 5 is a flow chart illustrating a process 500 to group scan a CAP sense interface, in accordance with an embodiment of the invention. Process 500 may be used in connection with CAP sense interfaces 300, 400, or otherwise. Process 500 will be described with reference to FIGS. 5, 6A, and 6B. FIG. 6A is a diagram illustrating a group scan of circular slider array 315, while FIG. 6B is a diagram illustrating a group scan of a linear slider array 415, in accordance with an embodiment of the invention.

The processes explained below are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like. The order in which some or all of the process blocks appear in each process should not be deemed limiting. Rather, one of ordinary skill in the art having the benefit of the present disclosure will understand that some of the process blocks may be executed in a variety of orders not illustrated.

In a process block 505, the group scan is commenced. A first group of CAP sensors (e.g., CAP sensors 320 or CAP sensors 420) are selected to be the current sensor group 605. For the sake of discussion, process 500 will be discussed with reference to FIG. 6A and CAP sense interface 300; however, process 500 is equally applicable to CAP sense interface 400 and FIG. 6B.

FIG. 6A illustrates an embodiment where each sensor group includes three individual CAP sensors 320; however, it should be appreciated that sensor groups may include two or more CAP sensors 320. A sensor group is defined herein to include two or more CAP sensors 320 concurrently coupled to CAP sensor circuit 305 at a given instant in time via I/O interface 310, such that their collective group capacitance can be measured. Accordingly, FIG. 6A illustrates eight different current sensor groups 605 during eight different instants in time t0 to t7. Current sensor groups 605 are illustrated as the shaded pie-sliced CAP sensors 320.

In a decision block 510, a user interacts with CAP sense interface 300 by bring a conductive object (e.g., user's finger) in proximity to circular slider array 315. FIG. 6A illustrates the physical location of a user interaction with circular slider array 315 with location circles 610 (only a portion are labeled so as not to clutter the figure).

In a process block 515, CAP sensor circuit 305 measures the combined capacitance of current sensor group 605. In one embodiment, CAP sensor circuit 305 in fact measures a value that is indicative of a combined capacitance or a combined capacitance deviation from a baseline value for current sensor group 605. Measuring a threshold capacitance deviation from the baseline value for a threshold period of time is an indication that a user is interacting with current sensor group 605. As mentioned above, the measured value is indicative of the capacitance or capacitance change/deviation and may include a count value related to a relaxation oscillator frequency or period.

In one embodiment, the combined capacitance of current sensor group 605 is measured by electrically connecting CAP sensors 320 within current sensor group 605 and measuring this combined capacitance. Accordingly, the logical groupings of CAP sensors 320 (i.e., the sensor groups) are temporal electrical connections of two or more CAP sensors 320 to CAP sensor circuit 305. By electrically connected two or more CAP sensors 320, a larger (and therefore more sensitive) capacitance electrode is temporally created. In one embodiment, the sensor groups are temporally connected through an analog bus to a shared relaxation oscillator circuit through low impedance switches. The analog bus conducts an analog value indicative of the combined capacitance change of all electrically connected CAP sensors 320 within the current sensor group 605.

FIG. 6A illustrates values 615 measured at different times t0-t7 for each sensor group. At time t0, current sensor group 605 is only partially coincident with the user interaction location 610. Therefore, at time t0, the current sensor group 605 will register only a small baseline capacitance deviation, illustrated as value=0.5. At times t1, t2, and t3 the measured value increases as the degree of coincidence between user interaction location 610 and current sensor groups 605 increases. At times t4, t5, t6, and t7, the degree of coincidence is decreasing with each successive current sensor group 605 and therefore the measured values decrease.

In a process block 520, the measured value for current sensor group 605 is buffered. In a process block 525, the measured value for the current sensor group 605 is indexed or assigned to a nominal CAP sensor that is a member of the current sensor group 605. In the illustrated embodiment, the nominal CAP sensor is the particular CAP sensor 320 that is physically located in the middle of each sensor group. FIGS. 6A and 6B illustrate the nominal CAP sensor with the darkest shading. It should be appreciated though that the nominal CAP sensor need not be the middle CAP sensor and in the case where each sensor group includes an even number of CAP sensors 320 there may not be a physically middle CAP sensor.

In decision block 530, it is determine whether all sensor groups within circular slider array 315 have been scanned (e.g., each combined group capacitance deviation value measured). If not, then process 500 continues to a process block 535. In process block 535, the next sensor group (e.g., that illustrated at time t1) is updated to be the current sensor group 605 and the next nominal CAP sensor 320 is updated to be the current nominal CAP sensor 320. It should be appreciated that updating current sensor group 605 to be the next sensor group may be implemented by reconfiguring I/O interface 310 to couple CAP sensor circuit 305 to the individual CAP sensors 320 making up the next sensor group. Accordingly, the CAP sensors 320 of the current logical sensor group are disconnected and the CAP sensors 320 of the next logical sensor group are electrically connected via I/O interface 310. In one embodiment, the electrically connected CAP sensors 320 of the current logical sensor group are temporally connected to a single CAP sensor circuit 305 for the next iteration through the loop within process 500. Once CAP sensor circuit 305 is coupled to the next sensor group to be scanned, process 500 returns to process block 515 and proceeds as described above.

In an alternative embodiment, CAP sensor circuit 305 may include multiple relaxation oscillators and I/O interface 310 may be capable of coupling each relaxation oscillator to a different sensor group at the same time. In this alternative embodiment, CAP sensor circuit 305 would be capable of completing a scanning cycle of the sensor groups in less time than an embodiment where each sensor group is sequentially measured.

Returning to decision block 530, if all sensor groups have been scanned (i.e., a capacitance related values for each sensor group has been measured and buffered in memory), then process 500 continues to a process block 540. In process block 540 the buffered values are analyzed to determine the physical location and/or the direction of motion (in the case of scrolling) of physical location 610. In a process block 545, measured values may be analyzed to interpolate the location 610 of the user interaction to a greater degree of accuracy/precision than the individual CAP sensors 320 using a discrete scan could provide. To determine the location/motion of physical location 610, the measured values may be fed into a decision algorithm, which analyses the values, making use of the fact that each value depends on how centrally located the user interaction is relative to each sensor group. In one embodiment, the decision algorithm is a software entity.

Process 500 increases the SNR of a capacitive sense interface by logically combining discrete physical CAP sensors into sensor groups. Values indicative of a combine group capacitance are then measured for each sensor group and assigned to a nominal CAP sensor, which is a member of the particular sensor group. Since adjacent sensor groups may include common CAP sensors, the effective size and therefore resulting capacitance of each nominal CAP sensor is increased, thereby increasing the SNR. To illustrate with reference to FIG. 6A, current sensor group 605 at time t0 includes two common CAP sensors 320 with current sensor group 605 at time t1. Similarly, current sensor group 605 at time t1 includes two common CAP sensors 320 with current sensor group 605 at time t2. The increased SNR obtained by the group scan enables thicker dielectric protective overlays (e.g., for use with white goods or other durable consumer goods) and/or shrinkage of physical CAP sense interfaces for use in ever smaller electronic devices.

Figure 7:
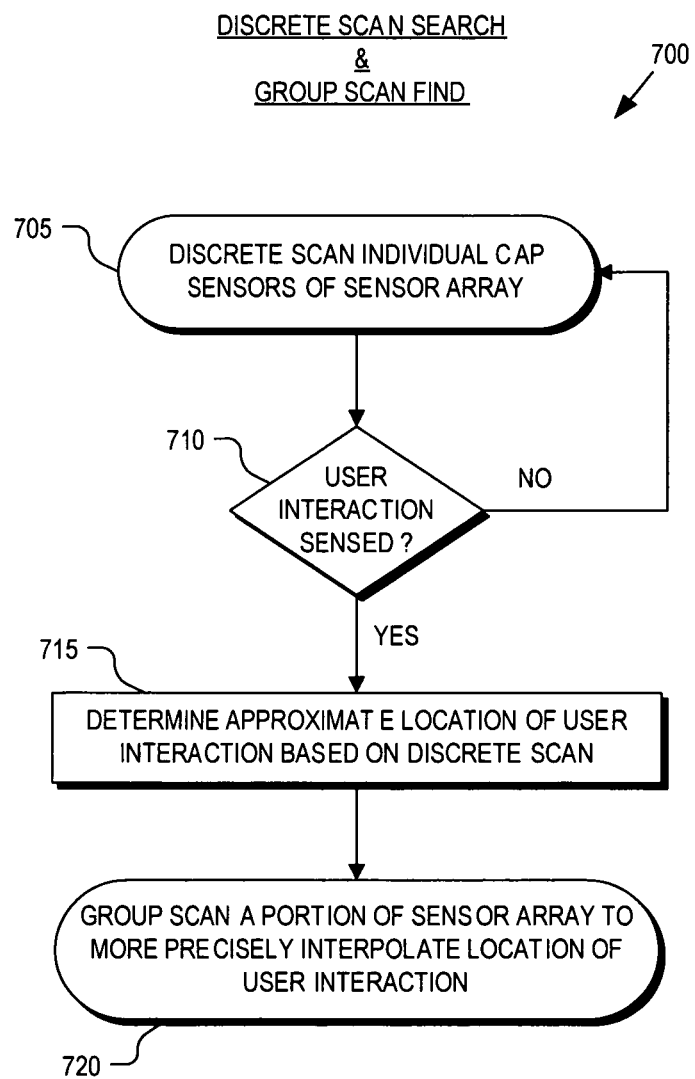
FIG. 7 is a flow chart illustrating a process to perform quick discrete scans of a capacitive sense user interface until a user interaction is sensed and then perform a group scan to more precisely interpolate the location of the user interaction, in accordance with an embodiment of the invention.

FIG. 7 is a flow chart illustrating a process 700 to perform quick discrete scans of CAP sense interfaces 300 or 400 until a user interaction is sensed and then perform a group scan to more precisely interpolate the location of the user interaction, in accordance with an embodiment of the invention. In other words, process 700 implements a coarse, but quick, search function using the discrete scan to determine an approximate location of a user interaction and then implements a slower, but more precise, find function using the group scan on a portion of circular slider array 315 to determine with greater accuracy and sensitivity the location of the user interaction. Again, process 700 is described with reference to circular slider array 315, but is equally applicable to linear slider array 415 or a planar touch pad array (not illustrated).

In a process block 705, the individual CAP sensors 320 of circular slider array 315 are discretely scanned. Discretely scanning CAP sensors 320 includes sequentially measuring a value indicative of a capacitance or capacitance change of each CAP sensor 320. In one embodiment, this is accomplished by configuring I/O interface 310 to sequentially couple each CAP sensor 320 to CAP sensor circuit 305 to measure each value in isolation. Alternatively, CAP sensor circuit 305 may be capable of measuring multiple values for discrete CAP sensors 320 concurrently, as discussed above.

In a decision block 710, if a user interaction with circular slider array 315 is detected, then process 700 continues to a process block 715. In process block 715, an approximate location of the user interaction is determined based on the measured values obtained from the discrete scan in process block 705. The approximate location determined via the quick discrete scan may limit the possible location of the user interaction to a portion of circular slider array 315, such as for example, the top half, the top quarter, etc.

In a process block 720, a group scan (see process 500) is performed only on a portion of CAP sensors 320 localized about the approximate location of the user interaction determined in process block 715. The values indicative of the combined group capacitances or capacitance changes obtained from the localized group scan can then be used to more precisely, and with greater sensitivity, interpolate the location of the user interaction with circular slider array 315.

Figure 8:
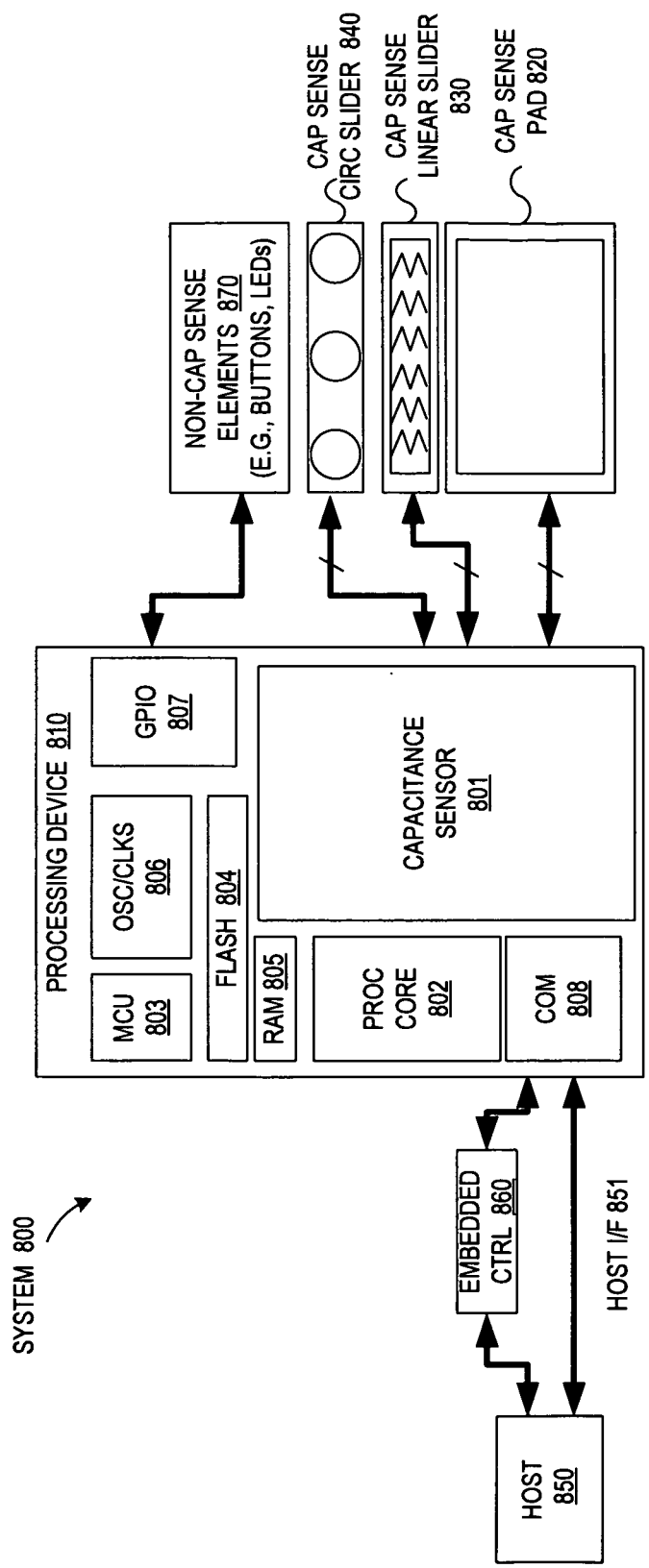
FIG. 8 is a functional block diagram illustrating a demonstrative processing system for implementing a capacitance sense user interface, in accordance with an embodiment of the invention.

FIG. 8 is a functional block diagram illustrating a demonstrative system 800 for implementing a capacitance sense user interface, in accordance with an embodiment of the invention. System 800 includes a processing device 810, a capacitive sense pad 820, a capacitive sense linear slider 830, a capacitive sense circular slider 840, a host processor 850, an embedded controller 860, and non-capacitance sensor elements 870. Processing device 810 may include analog and/or digital general purpose input/output ("GPIO") ports 807. GPIO ports 807 may be programmable. GPIO ports 807 may be coupled to a Programmable Interconnect and Logic ("PIL"), which acts as an interconnect between GPIO ports 807 and a digital block array of processing device 810 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 810 may also include memory, such as random access memory (RAM) 805 and program flash 804. RAM 805 may be static RAM ("SRAM"), and program flash 804 may be a non-volatile storage, which may be used to store firmware (e.g., control algorithms executable by processing core 802 to implement operations described herein such as the aforementioned decision algorithm). Processing device 810 may also include a memory controller unit ("MCU") 803 coupled to memory and the processing core 802.

Processing device 810 may also include an analog block array (not illustrated). The analog block array is also coupled to the system bus. The analog block array also may be configured to implement a variety of analog circuits (e.g., ADC, analog filters, etc.) using, in one embodiment, configurable UMs. The analog block array may also be coupled to the GPIO 807.

As illustrated, capacitance sensor 801 may be integrated into processing device 810. Capacitance sensor 801 may include analog I/O for coupling to an external component, such as capacitive sense pad 820, capacitive sense linear slider 830, capacitive sense circular slider 840, and/or other devices. Capacitance sensor 801 is described in more detail below.

Processing device 810 may include internal oscillator/clocks 806 and communication block 808. The oscillator/clocks block 806 provides clock signals to one or more of the components of processing device 810. Communication block 808 may be used to communicate with an external component, such as a host processor 850, via host interface (I/F) line 851. Alternatively, processing device 810 may also be coupled to embedded controller 860 to communicate with the external components, such as host 850. Interfacing to the host 850 can be through various methods. In one exemplary embodiment, interfacing with the host 850 may be done using a standard PS/2 interface to connect to embedded controller 860, which in turn sends data to the host 850 via low pin count (LPC) interface. In some instances, it may be beneficial for processing device 810 to do both touch-sensor pad and keyboard control operations, thereby freeing up the embedded controller 860 for other housekeeping functions. In another exemplary embodiment, interfacing may be done using a universal serial bus (USB) interface directly coupled to host 850 via host interface line 851. Alternatively, processing device 810 may communicate to external components, such as host 850 using industry standard interfaces, such as USB, PS/2, inter-integrated circuit (I2C) bus, or system packet interfaces (SPI). Host 850 and/or embedded controller 860 may be coupled to processing device 810 with a ribbon or flex cable from an assembly, which houses the sensing device and processing device.

In one embodiment, processing device 810 is configured to communicate with embedded controller 860 or host 850 to send and/or receive data. The data may be a command or alternatively a signal. In an exemplary embodiment, system 800 may operate in both standard-mouse compatible and enhanced modes. The standard-mouse compatible mode utilizes the HID class drivers already built into the Operating System (OS) software of host 850. These drivers enable processing device 810 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, processing device 810 may be configured to communicate with embedded controller 860 or host 850, using non-OS drivers, such as dedicated touch-sensor pad drivers, or other drivers known by those of ordinary skill in the art.

Processing device 810 may reside on a common carrier substrate such as, for example, an integrated circuit (IC) die substrate, a multi-chip module substrate, or the like. Alternatively, the components of processing device 810 may be one or more separate integrated circuits and/or discrete components. In one exemplary embodiment, processing device 810 may be a Programmable System on a Chip (PSoC™) processing device, manufactured by Cypress Semiconductor Corporation, San Jose, Calif. Alternatively, processing device 810 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like. In an alternative embodiment, for example, processing device 810 may be a network processor having multiple processors including a core unit and multiple microengines. Additionally, processing device 810 may include any combination of general-purpose processing device(s) and special-purpose processing device(s).

Capacitance sensor 801 may be integrated into the IC of processing device 810, or alternatively, in a separate IC. Descriptions of capacitance sensor 801 may be generated and compiled for incorporation into other integrated circuits. For example, behavioral level code describing capacitance sensor 801, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 801.

In one embodiment, electronic system 800 may be used in a notebook computer. Alternatively, system 800 may be used in other applications, such as a mobile handset, a personal data assistant (PDA), a keyboard, a television, a remote control, a monitor, a handheld multi-media device, a handheld video player, a handheld gaming device, or a control panel.

In one embodiment, capacitance sensor 801 may be a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The CSR may include physical, electrical, and software components. The physical component may include the physical switch itself, typically a pattern constructed on a printed circuit board ("PCB") with an insulating cover, a flexible membrane, or a transparent overlay. The electrical component may include an oscillator or other means to convert a changed capacitance into a measured signal. The electrical component may also include a counter or timer to measure the oscillator output. The software component may include detection, compensation, and decision software algorithms to convert the count value into a capacitive sensor detection decision.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in processing device 810. The charge transfer may be conceptually similar to an R-C charging circuit. In this method, $C_P$ the capacitance being sensed and $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter.

Figure 9:
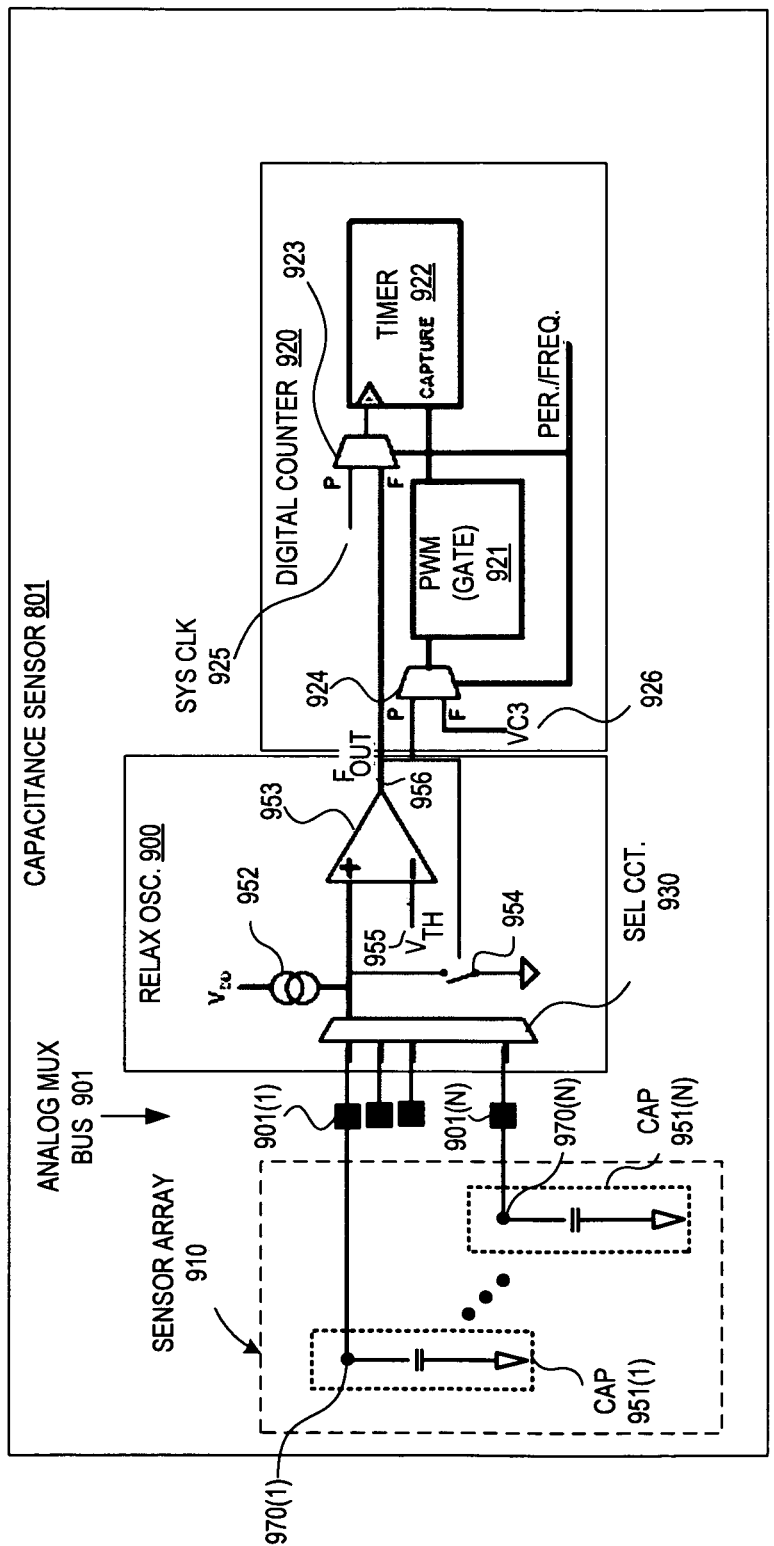
FIG. 9 is a circuit diagram illustrating a demonstrative capacitance sensor, in accordance with an embodiment of the invention.

FIG. 9 illustrates one possible embodiment of capacitance sensor 801 implemented with a relaxation oscillator circuit 900. The illustrated embodiment of capacitance sensor 801 includes relaxation oscillator circuit 900, an analog multiplexer ("MUX") bus 901, a sensor array 910, and a digital counter 920. Analog MUX bus 901 and selection circuit 930 may collectively implement the functionality of I/O interconnects 310 and 410. The remaining portions of relaxation oscillator 900 and digital counter 920 may implement the functionality of CAP sensor circuits 305 and 405. Sensor array 910 may represent any of circular slider array 315, linear slider array 415, or a planar touch pad array.

Relaxation oscillator 900 is formed by the capacitance to be measured on capacitor sensors 951, a charging current source 952, a comparator 953, and a reset switch 954. It should be noted that capacitor sensor 951 are representative of the capacitance measured on a sensor element of a CAP sensor array. The relaxation oscillator is coupled to drive a charging current Ic in a single direction onto a device under test ("DUT") capacitor, any of capacitor sensors 951. As the charging current piles charge onto the capacitor 951, the voltage across the capacitor increases with time as a function of Ic and its capacitance C. Equation (1) describes the relation between current, capacitance, voltage and time for a charging capacitor.

$$CdV = I_c dt \qquad (1)$$

The relaxation oscillator begins by charging the capacitor sensor 951 from a ground potential or zero voltage and continues to pile charge on the capacitor 951 at a fixed charging current Ic until the voltage across the capacitor 951 at node 970 reaches a reference voltage or threshold voltage, $V_{TH}$ 955. At $V_{TH}$ 955, the relaxation oscillator allows the accumulated charge at node 955 to discharge (e.g., the capacitor 951 to "relax" back to the ground potential) and then the process repeats itself. In particular, the output of comparator 953 asserts a clock signal $F_{OUT}$ 956 (e.g., $F_{OUT}$ 956 goes high), which enables the reset switch 954. This resets the voltage on the capacitor at node 970 to ground and the charge cycle starts again. The relaxation oscillator outputs a relaxation oscillator clock signal ($F_{OUT}$ 956) having a frequency ($f_{RO}$) dependent upon capacitance C of the capacitor 951 and charging current Ic.

The comparator trip time of the comparator 953 and reset switch 954 add a fixed delay. The output of the comparator 953 is synchronized with a reference system clock to guarantee that the comparator reset time is long enough to completely reset the charging voltage on capacitor 955. For example, if capacitance C of the capacitor 951 changes, then $f_{RO}$ will change proportionally according to Equation (1). By comparing $f_{RO}$ of $F_{OUT}$ 956 against a frequency ($f_{REF}$) of a known reference system clock signal (REF CLK), the change in capacitance $\Delta C$ can be measured. Accordingly, equations (2) and (3) below describe that a change in frequency between $F_{OUT}$ 956 and REF CLK is proportional to a change in capacitance of the capacitor 951.

$$\Delta C \propto 1/\Delta f, \text{where} \qquad (2)$$

$$\Delta f = f_{RO} - f_{REF} \qquad (3)$$

In one embodiment, a frequency comparator may be coupled to receive relaxation oscillator clock signal ($F_{OUT}$ 956) and REF CLK, compare their frequencies $f_{RO}$ and $f_{REF}$, respectively, and output a signal indicative of the difference $\Delta f$ between these frequencies. By monitoring $\Delta f$ one can determine whether the capacitance of the capacitor 951 has changed.

In one exemplary embodiment, the relaxation oscillator 950 may be built using a programmable timer (e.g., 555 timer) to implement the comparator 953 and reset switch 954. Alternatively, the relaxation oscillator 900 may be built using other circuits.

Sensor array 910 includes a plurality of sensor elements 955(1)-955(N), where N is a positive integer value that represents the number of capacitive sensors within any of capacitive sense pad 820, capacitive sense linear slider 830, or capacitive sense circular slider 840. Relaxation oscillator 900 further includes a selection circuit 930. Selection circuit 930 is coupled to the plurality of sensor elements 951(1)-951(N), the reset switch 954, the current source 952, and the comparator 953. Selection circuit 930 may be used to allow the relaxation oscillator 900 to measure capacitance on multiple sensor elements (e.g., rows or columns). The selection circuit 930 may be configured to sequentially select a sensor element of the plurality of sensor elements to provide the charge current and to measure the capacitance of each sensor element. In one embodiment, selection circuit 930 is a multiplexer array of the relaxation oscillator 900. Alternatively, selection circuit may be other circuitry outside the relaxation oscillator 900, or even outside the capacitance sensor 801 to select the sensor element to be measured. Capacitance sensor 801 may include one relaxation oscillator and digital counter for the plurality of sensor elements of the sensor array. Alternatively, capacitance sensor 801 may include multiple relaxation oscillators and digital counters to measure capacitance on the plurality of sensor elements of the sensor array. The multiplexer array may also be used to ground the sensor elements that are not being measured. This may be done in conjunction with a dedicated pin in the GPIO port 807.

In another embodiment, the capacitance sensor 801 may be configured to simultaneously scan the sensor elements, as opposed to being configured to sequentially scan the sensor elements as described above. For example, the sensing device may include a sensor array having a plurality of rows and columns. The rows may be scanned simultaneously, and the columns may be scanned simultaneously.

In one embodiment, the voltages on all of the rows of the sensor array are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in the other dimension.

In another exemplary embodiment, the voltages on all of the rows of the sensor array are simultaneously moved in a positive direction, while the voltages of the columns are moved in a negative direction. Next, the voltages on all of the rows of the sensor array are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

Digital counter 920 is coupled to the output of the relaxation oscillator 900. Digital counter 920 receives the relaxation oscillator output signal 956 ($F_{OUT}$). Digital counter 920 is configured to count at least one of a frequency or a period of the relaxation oscillator output received from the relaxation oscillator.

When a finger or conductive object is placed on a sensor element 951, the capacitance increases so the relaxation oscillator output signal 956 ($F_{OUT}$) decreases. The relaxation oscillator output signal 956 ($F_{OUT}$) is fed to the digital counter 920 for measurement. There are at least two methods for counting the relaxation oscillator output signal 956, frequency measurement and period measurement. In one embodiment, the digital counter 920 may include two multiplexers 923 and 924. Multiplexers 923 and 924 are configured to select the inputs for the PWM 921 and the timer 922 for the two measurement methods, frequency and period measurement methods. Alternatively, other selection circuits may be used to select the inputs for the PWM 921 and the time 922. In another embodiment, multiplexers 923 and 924 are not included in the digital counter, for example, digital counter 920 may be configured in one, or the other, measurement configuration.

In the frequency measurement method, the relaxation oscillator output signal 956 is counted for a fixed period of time. The counter 922 is read to obtain the number of counts during the gate time. This method works well at low frequencies where the oscillator reset time is small compared to the oscillator period. A pulse width modulator (PWM) 921 is clocked for a fixed period by a derivative of the system clock, VC3 926 (which is a divider from system clock 925, e.g., 24 MHz). Pulse width modulation is a modulation technique that generates variable-length pulses to represent the amplitude of an analog input signal; in this case VC3 926. The output of PWM 921 enables timer 922 (e.g., 16-bit). The relaxation oscillator output signal 956 clocks the timer 922. The timer 922 is reset at the start of the sequence, and the count value is read out at the end of the gate period.

In the period measurement method, the relaxation oscillator output signal 956 gates a timer 922, which is clocked by the system clock 925 (e.g., 24 MHz). In order to improve sensitivity and resolution, multiple periods of the oscillator are counted with the PWM 921. The output of PWM 921 is used to gate the timer 922. In this method, the relaxation oscillator output signal 956 drives the clock input of PWM 921. As previously described, pulse width modulation is a modulation technique that generates variable-length pulses to represent the amplitude of an analog input signal; in this case the relaxation oscillator output signal 956. The output of the PWM 921 enables timer 922 (e.g., 16-bit), which is clocked at the system clock frequency 925 (e.g., 24 MHz). When the output of PWM 921 is asserted (e.g., goes high), the count starts by releasing the capture control. When the terminal count of the PWM 921 is reached, the capture signal is asserted (e.g., goes high), stopping the count and setting the PWM's interrupt. The timer value is read in this interrupt. The relaxation oscillator 900 is indexed to the next capacitive sensor (e.g., capacitor 951(2)) to be measured and the count sequence is started again.

The length of the counter 922 and the detection time required for capacitance sensor 801 are determined by sensitivity requirements. Small changes in the capacitance on sensor element 951 result in small changes in frequency. In order to find these small changes, it may be necessary to count for a considerable time.

At startup (or boot) the capacitive sensors (e.g., sensor elements 951(1)-(N)) are scanned and the count values for each capacitive sensors with no actuation are stored as a baseline array (Cp). The presence of a finger on the switch is determined by the difference in counts between a stored value for no capacitive sensors actuation and the acquired value with capacitive sensors actuation, referred to here as Δn. The sensitivity of a single capacitive sensors is approximately:

$$\frac{\Delta n}{n} = \frac{Cf}{Cp} \qquad (4)$$

The value of Δn should be large enough for reasonable resolution and clear indication of capacitive sensors actuation.

Using the multiplexer array 930, multiple sensor elements may be sequentially scanned to provide current to and measure the capacitance from the capacitors (e.g., sensor elements), as previously described. In other words, while one sensor element is being measured, the remaining sensor elements are grounded using the GPIO port 807. This drive and multiplex arrangement bypasses the existing GPIO to connect the selected pin to an internal analog multiplexer (mux) bus. The capacitor charging current (e.g., current source 952) and reset switch 953 are connected to the analog mux bus. This may limit the pin-count requirement to simply the number of capacitive sensors (e.g., capacitors 951(1)-951(N)) to be addressed. In one exemplary embodiment, no external resistors or capacitors are required inside or outside the processing device 910 to enable operation.

The capacitor charging current for the relaxation oscillator 900 is generated in a register programmable current output DAC (also known as IDAC). Accordingly, the current source 952 is a current DAC or IDAC. The IDAC output current may be set by an 8-bit value provided by the processing device 810, such as from the processing core 802. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular switch array may be determined to some degree by experimentation.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method comprising:
electrically coupling capacitance sense electrodes of a capacitive sense array into a first group of a plurality of groups, each of the plurality of groups comprising two or more capacitance sense electrodes, wherein the capacitive sense array is configured to sense capacitance indicative of a touch proximate the capacitive sense array;
measuring, at a first time, a first single value of a capacitance of the first group comprising the two or more capacitance sense electrodes;
electrically coupling the capacitance sense electrodes of the capacitive sense array into a second group of the plurality of groups, wherein the first group and the second group of the plurality of groups are different groups and comprise at least one capacitance sense electrode in common;
measuring a second single value of a capacitance of the second group at a second time, the second time being different from the first time; and
analyzing at least the first single value and the second single value to determine a location of a user interaction with the capacitive sense array.

2. The method of claim 1, wherein electrically coupling the capacitance sense electrodes comprises sequentially connecting, during scanning, each of the plurality of groups to a shared capacitance sensor circuit.

3. The method of claim 1, further comprising:
assigning the first single value to a particular capacitance sense electrode within the first group; and
assigning the second single value to a particular capacitance sense electrode within the second group.

4. The method of claim 3, wherein the first group and the second group each comprises physically adjacent capacitance sense electrodes.

5. The method of claim 4, wherein the first group and the second group each comprises an odd number of the capacitance sense electrodes, wherein assigning the first single value comprises assigning the first single value to a middle capacitance sense electrode of the first group, and wherein assigning the second single value comprises assigning the second single value to a middle capacitance sense electrode of the second group.

6. The method of claim 1, wherein analyzing the first single value and the second single value comprises interpolating a center of the location of the user interaction with the plurality of groups based on the first single value and the second value.

7. The method of claim 1, wherein the capacitance sense electrodes of the capacitive sense array are part of a linear slider of a user interface.

8. The method of claim 1, wherein the capacitance sense electrodes of the capacitive sense array are part of a circular slider of user interface.

9. The method of claim 1, wherein the capacitance sense electrodes of the capacitive sense array are part of a touch pad of a user interface.

10. The method of claim 1, further comprising:
scanning, discretely and individually, each of the capacitance sense electrodes of the capacitive sense array; and
determining an approximate location of the user interaction based on the scanning,
wherein measuring the first single value and measuring the second single value comprises measuring a capacitance for a portion of the plurality of groups localized about the approximate location to more precisely determine the location after the discretely and individually scanning of each of the capacitance sense electrodes, wherein the portion of the plurality of groups is less than all of the plurality of groups of the capacitive sense array.

11. A non-transitory machine-readable medium that provides instructions that when executed by a processing device cause the processing device to:
electrically couple, by the processing device, capacitance sense electrodes of a capacitive sense array into a first group of a plurality of groups, each of the plurality of groups comprising two or more capacitance sense electrodes, wherein the capacitive sense array is configured to sense capacitance indicative of a touch proximate the capacitive sense array;
measure, at a first time, a first single value of a combined capacitance of the first group comprising the two or more capacitance sense electrodes;
electrically couple the capacitance sense electrodes of the capacitive sense array into a second group of the plurality of groups, wherein a first group and a second group of the plurality of groups are different groups and comprise at least one capacitance sense electrode in common;
measure a second single value of a combined capacitance of the second group at a second time, the second time being different from the first time; and
analyze at least the first single value and the second single value to determine a location of a user interaction with the capacitive sense array.

12. The non-transitory machine-readable medium of claim 11, wherein the first group and the second group each comprise physically adjacent capacitance sense electrodes.

13. The non-transitory machine-readable medium of claim 11, the processing device further to:
scan, discretely and individually, each of the capacitance sense electrodes of the capacitive sense array; and
determine an approximate location of the user interaction based on the scanning,
wherein to measure the first single value and measure the second single value the processing device to measure a capacitance for a portion of the plurality of groups localized about the approximate location to more precisely determine the location after the discretely and individually scanning of each of the capacitance sense electrodes, wherein the portion of the of the plurality of groups is less than all of the plurality of groups within the capacitive sense array.

14. An apparatus comprising:
a processing device;
a user interface comprising capacitance sense electrodes of a capacitive sense array coupled to the processing device, wherein the capacitive sense array is configured to sense capacitance indicative of a touch proximate the capacitive sense array; and
a memory unit coupled to the processing device, the memory unit having stored therein instructions that when executed by the processing device cause the processing device to:
electrically couple the capacitance sense electrodes of the capacitive sense array into a first group of a plurality of groups, each of the plurality of groups comprising two or more capacitance sense electrodes;
measure, at a first time, a first single value of a combined capacitance of the first group comprising the two or more capacitance sense electrodes;

electrically couple the capacitance sense electrodes of the capacitive sense array into a second group of the plurality of groups, wherein the first group and the second group of the plurality of groups are different groups and comprise at least one capacitance sense electrode in common;

measure a second single value of a combined capacitance of the second group at a second time, the second time being different from the first time; and analyze at least the first single value and the second single value to determine a location of a user interaction with the capacitive array.

15. The apparatus of claim 14, wherein the first group and the second group each comprise physically adjacent capacitance sense electrodes.

16. The apparatus of claim 14, wherein the processing device comprises:

a capacitance sensor circuit coupled to the capacitive sense array and configured to measure the first single value and the second single value; and an analog multiplexer bus coupled to the capacitance sensor circuit and configured to sequentially couple the plurality of groups to the capacitance sensor circuit.

17. The apparatus of claim 16, wherein the capacitance sensor circuit comprises a relaxation oscillator circuit.

18. The apparatus of claim 17, wherein the user interface is at least one of a linear slider, a circular slider, or a touch pad.

* * * * *